United States Patent [19]
Murakami

[11] Patent Number: 5,843,258
[45] Date of Patent: Dec. 1, 1998

[54] METHOD OF JOINING THE ENDS OF A FABRIC LAYER ON A BELT/BELT SLEEVE AND TRANSFERRING AN IDENTIFYING MARK THEREON

[75] Inventor: Satoshi Murakami, Ottawa, Ill.

[73] Assignee: MBL (USA) Corporation, Ottawa, Ill.

[21] Appl. No.: 707,948

[22] Filed: Sep. 10, 1996

[51] Int. Cl.$^6$ .............................. B29D 29/00; F16G 3/10
[52] U.S. Cl. ...................... 156/137; 152/277; 152/304.3; 152/309.6; 152/139; 474/271; 474/238; 474/242
[58] Field of Search ..................... 156/137, 138, 156/139, 140, 141, 277, 304.3, 309.6, 304.4; 474/238, 242, 265, 266, 268, 271

[56] References Cited

U.S. PATENT DOCUMENTS 5,224,905  7/1993  Mishima .

FOREIGN PATENT DOCUMENTS 0492960  7/1992  European Pat. Off. .

*Primary Examiner*—Michael W. Ball
*Assistant Examiner*—Sam Chuan Yao
*Attorney, Agent, or Firm*—Wood, Phillips, VanSanten, Clark & Mortimer

[57] ABSTRACT

A method of joining a woven fabric on a power transmission belt and transferring an identifying mark thereon by providing a discrete sheet element with an identifying mark thereon, providing a woven sheet having spaced ends, abutting the spaced ends of the woven sheet to each other, placing the discrete sheet element over the abutted ends of the woven sheet, adhering the discrete sheet element to the abutted ends of the woven sheet, and combining the woven sheet with the discrete sheet element adhered thereto with at least one other component to produce an unvulcanized power transmission belt/belt sleeve, wherein the surface of the power transmission belt defined by the woven sheet is characterized by the absence of any recessed or stepped portions.

20 Claims, 4 Drawing Sheets

METHOD OF JOINING THE ENDS OF A FABRIC LAYER ON A BELT/BELT SLEEVE AND TRANSFERRING AN IDENTIFYING MARK THEREON

BACKGROUND OF THE INVENTION

1. Technical Field

This invention relates to power transmission belts and, more particularly, to a method of joining the ends of a woven fabric layer and transferring an identifying mark onto the fabric cover layer at the joint. The invention also contemplates a power transmission belt formed from the above method.

2. Background Art

It is well known in the power transmission belt art to provide a reinforcing woven fabric cover layer on an exposed surface of a power transmission belt, such as V-ribbed belts, toothed belts, V-belts, etc. The ends of the fabric cover layer are joined together to define an endless band of cover fabric which is provided on a cylindrical forming drum. Belt components are then sequentially built up on the forming drum over the cover layer to construct the power transmission belt.

Different methods of connecting the ends of the fabric cover layer have been utilized in the prior art. In one such method, the ends of the fabric cover layer are overlapped so that a "stepped portion" is defined on the outer surface of the belt. While this method is desirable due to the ease with which it can be carried out, a problem arises when the belt is run in a reverse-bend mode. In the reverse-bend mode, the outside surface of the belt comes into direct contact with at least one pulley in a system. As a result, noise may be generated when the stepped portion of the belt comes into contact with the pulley(s) causing rough system operation.

To avoid the creation of this "step", some manufacturers have utilized an alternate method of fixing the relative positions of the ends of the fabric cover layer. By this method, there is no direct connection between the spaced ends of the fabric cover layer, but rather, an underlying rubber layer, which comprises part of the power transmission belt, adheres to the ends of the fabric cover layer and thereby maintains them in a predetermined relative position. A problem with this method is that often times a gap remains between the ends of the fabric cover layer. As a result, a portion of the power transmission belt underlying the fabric cover layer is exposed, thus producing a weak point where the fabric cover layer provides no reinforcement to the belt.

U.S. Pat. No. 5,224,905 ("the '905 patent") discloses a power transmission belt wherein the ends of the fabric cover layer are abutted edge-to-edge to produce a butt joint. The ends of the fabric cover layer are joined preferably by one of two different techniques. The first technique involves sewing the ends of the fabric cover layer together using an overlooking sewing machine. The second technique involves providing a sheet-like fusible material to one or both of the inside and outside surfaces of the fabric cover layer over the seam formed by the abutted edges. During the vulcanization process, the sheet-like material thermally fuses with the ends of the fabric cover layer to unitize the fabric cover layer into an endless band.

As described more fully in the '905 patent, this arrangement avoids the "step" formed by overlapping the ends of the fabric cover sheet and aids in the reduction of noise generated between the belt and cooperating pulleys in the system. While this construction permits smooth belt running and constant power transmission characteristics, it has one principal drawback.

A problem arises when the belt is run in a reverse-bend mode. As previously noted, in this mode the outside surface of the belt comes into direct contact with at least one pulley in the system. While there is no stepped portion to contact a pulley and generate noise, there is still noise generated as the thread or sheet-like fusible material, which connects the ends of the fabric cover and protrudes outwardly of the fabric cover sheet, encounters the pulley(s).

U.S. Pat. No. 5,344,369 ("the '369 patent") attempts to solve the problem of noise generation by utilizing a special thread to sew the ends of the fabric cover layer together. The thread disclosed in the '369 patent basically comprises first and second parts, with the first part of the thread, which is disposed on the exposed surface of the fabric cover layer, comprising at least one of (a) a twine of natural fibers and (b) a multi-filament twine of synthetic fibers. The second part of the thread, which is disposed on the surface of the fabric cover layer which abuts the belt body, comprises a mono-filament thread of synthetic fibers. Even utilizing this method, however, the threads disposed on the exposed surface of the fabric cover layer still come into direct contact with the pulleys when the belt is run in a reverse-bend mode. As a result, noise generation, while generally reduced from the prior art, is still present.

It is also common for manufacturers of power transmission belts to impress on an exposed surface thereof an identifying mark, such as a trade name, trademark, model number, etc. Typically, an unvulcanized, colored, rubber film with the desired identifying mark thereon is attached onto a substrate consisting of a transparent synthetic resin film to define a transfer mark sheet. This transfer mark sheet is adhered to a cylindrical forming drum. A fabric cover layer, impregnated with rubber, is then placed around the transfer mark sheet on the forming drum. Belt components consisting of a tension rubber layer, load-carrying cords, and a compression rubber layer are then sequentially built up on the forming drum over the fabric cover layer to form an unvulcanized belt sleeve. The unvulcanized belt sleeve (and forming drum) are then placed in a jacket for vulcanization using conventional techniques. Once the belt sleeve is removed from the forming drum, the substrate is peeled off to expose the identifying mark on the surface of the fabric cover layer that is impregnated with rubber.

The principal problem with the above-described method is that since the substrate and rubber film are forced into the surface of the belt sleeve, a slight depression is formed when the substrate is peeled off of the vulcanized belt sleeve. These slight depressions become significant in systems which are run in the reverse-bend mode. As the depressions on the surface of the belt encounter the pulley(s), undesirable vibrational noise may be generated.

U.S. application Ser. No. 08/531,164, which is a continuation of U.S. application Ser. No. 07/804,909, discloses a method of transferring an identifying mark onto a belt sleeve in an attempt to overcome the above-mentioned problems. Specifically, the transfer mark film with the identifying mark thereon is impressed into the fabric cover layer so that the transfer mark film, and hence the identifying mark thereon, embeds in the woven fibers of the fabric cover layer.

Thus, the manufacture of a power transmission belt having an identifying mark thereon encompasses joining the spaced ends of the fabric cover layer to define an endless cover layer band and transferring an identifying mark onto the cover layer as separate, distinct steps. This method is not good for productivity from a cost standpoint.

SUMMARY OF THE INVENTION

The present invention is specifically directed to overcoming the above-enumerated problems in a novel and simple manner.

The present invention is directed to a method of transferring an identifying mark onto a power transmission belt/belt sleeve by providing a discrete sheet element with an identifying mark thereon, providing a woven sheet having spaced ends, abutting the spaced ends of the woven sheet to each other, placing the discrete sheet element over the abutted ends of the woven sheet, adhering the discrete sheet element to the abutted ends of the woven sheet, and combining the woven sheet with the discrete sheet element adhered thereto with at least one other component to produce an unvulcanized power transmission belt/belt sleeve.

In one form, the discrete sheet element and the abutted ends of the woven sheet define a primary laminate, and the step of adhering the discrete sheet element to the abutted ends of the woven sheet includes the step of applying heat to the primary laminate.

In one form, the step of adhering the discrete sheet element to the abutted spaced ends of the woven sheet includes the step of pressing the discrete sheet element and woven sheet, one against the other.

In one form, heat is applied to the primary laminate at a temperature of 100° to 140° C. while pressing the discrete sheet element and woven sheet, one against the other.

In one form, the pressing is carried out under a pressure of between 2.0 to 3.0 kg/cm².

The woven sheet may be impregnated with an unvulcanized rubber before the step of adhering the discrete sheet element to the abutted ends of the woven sheet.

The discrete sheet element may be an unwoven fabric having at least one of (a) a resinbonded and (b) a spunbonded composition.

In one form, the discrete sheet element has a thickness of 0.10 to 0.40 mm and may consist of at least one of nylon, polypropylene, polyester and rayon.

The identifying mark may be applied to the discrete sheet element by a silk screen method carried out by at least one of (a) soaking the discrete sheet element in a plastic ink and (b) impregnating the discrete sheet element with an unvulcanized rubber.

The woven sheet may be a canvas sheet defined by woven warp and weft fibers.

The woven sheet with a discrete sheet element adhered thereto is placed on a forming drum and components are sequentially built up on the woven sheet making up a tension section, a load-carrying section and a compression section forming an unvulcanized power transmission belt/belt sleeve. The unvulcanized power transmission belt/belt sleeve is then vulcanized.

In one form, the abutted ends of the woven sheet define a butt joint and the discrete sheet element is placed over the abutted ends of the woven sheet and butt joint to define the primary laminate.

In one form, the step of adhering the discrete sheet element to the abutted ends of the woven sheet consists of the step of applying heat at a temperature of 100° to 140° C. while applying a pressure 2.0 to 3.0 kg/cm².

In one form of the invention, a power transmission belt has a belt body having a tension section, a load-carrying section and a compression section, inside and outside surfaces, and laterally spaced side surfaces. A woven sheet layer is disposed on at least one of the inside, outside and side surfaces and has a first surface abutting to the belt body and a second surface that is exposed with the woven sheet layer on the belt body. The woven sheet layer has spaced ends that are abutted to each other to form a butt joint, and a discrete sheet element having an identifying mark thereon abuts the abutted ends of the woven sheet layer and butt joint on the second surface. In this form, the discrete sheet element serves as a means of joining the abutted ends of the woven sheet together. The exposed surface of the discrete sheet element may be substantially flush with the second surface of the woven sheet layer, such that the second surface of the woven sheet is defined by the absence of any recessed or stepped portions.

After the belt sleeve is vulcanized, the inside surface of the belt sleeve, which is exposed outside of the drum, is cut to define ribs for the belts, which are then separated from the sleeve to define individual V-ribbed belts.

While the invention contemplates use with all types of power transmission belts, it is particularly desirable on V-ribbed belts on the outside surface thereof.

Other aspects, objects and advantages of the present invention can be obtained from a study of the specification, the drawings, and the appended claims.

DETAILED DESCRIPTION OF THE PREFERRED EMBODIMENT

Figure 1:
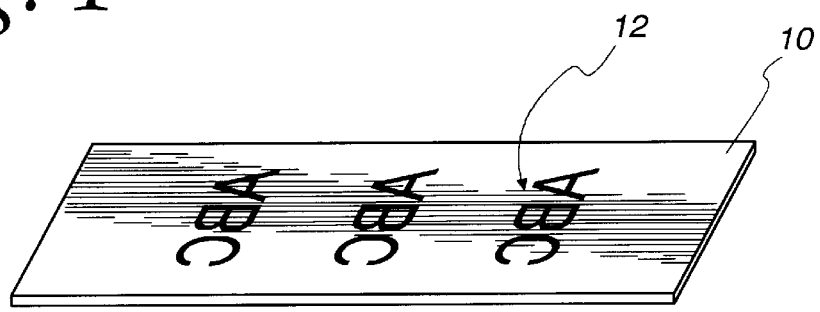
FIG. 1 is a perspective view of a discrete sheet element with an identifying mark thereon in accordance with the present invention.

FIG. 1 shows a discrete sheet element 10 that is usable for practicing the method of the present invention. More specifically, the discrete sheet element 10 consists of an unwoven fabric made of nylon, polypropylene, polyester, rayon, or any composite of these or similar materials. The discrete sheet element 10 may be of a resinbonded or spunbonded composition, and preferably has a thickness of 0.10 to 0.40 mm.

Figure 10:
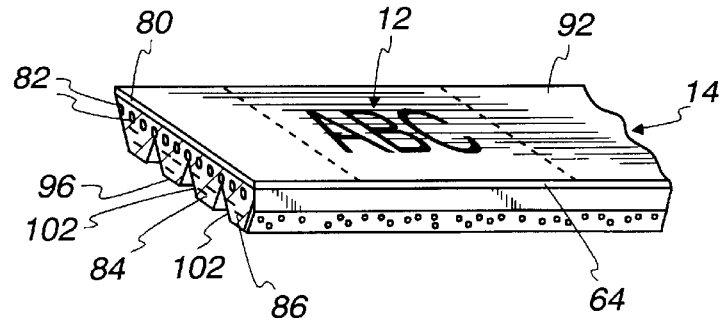
FIG. 10 is a perspective view of a section of a V-ribbed belt with an identifying mark thereon applied according to the method of the present invention.

Each discrete sheet element 10 has an identifying mark 12 thereon. For purposes of illustration, the letters "A", "B" and "C" have been used as the identifying mark 12. However, the identifying mark 12 may be any trade name, trademark, model number, etc., or any other message which the manufacturer wishes to display on an exposed surface of a power transmission belt 14 (FIG. 10).

In preferred forms, the identifying mark 12 may consist of an unvulcanized rubber or a plastic ink and is printed on the sheet element 10 by a conventional silk screen method comprising either impregnating the sheet element 10 with the unvulcanized rubber, or soaking the sheet element 10 in the plastic ink. Printing of letters utilizing a silk screen method is well known in the art, and accordingly, a detailed discussion thereof is not necessary.

Figure 2:
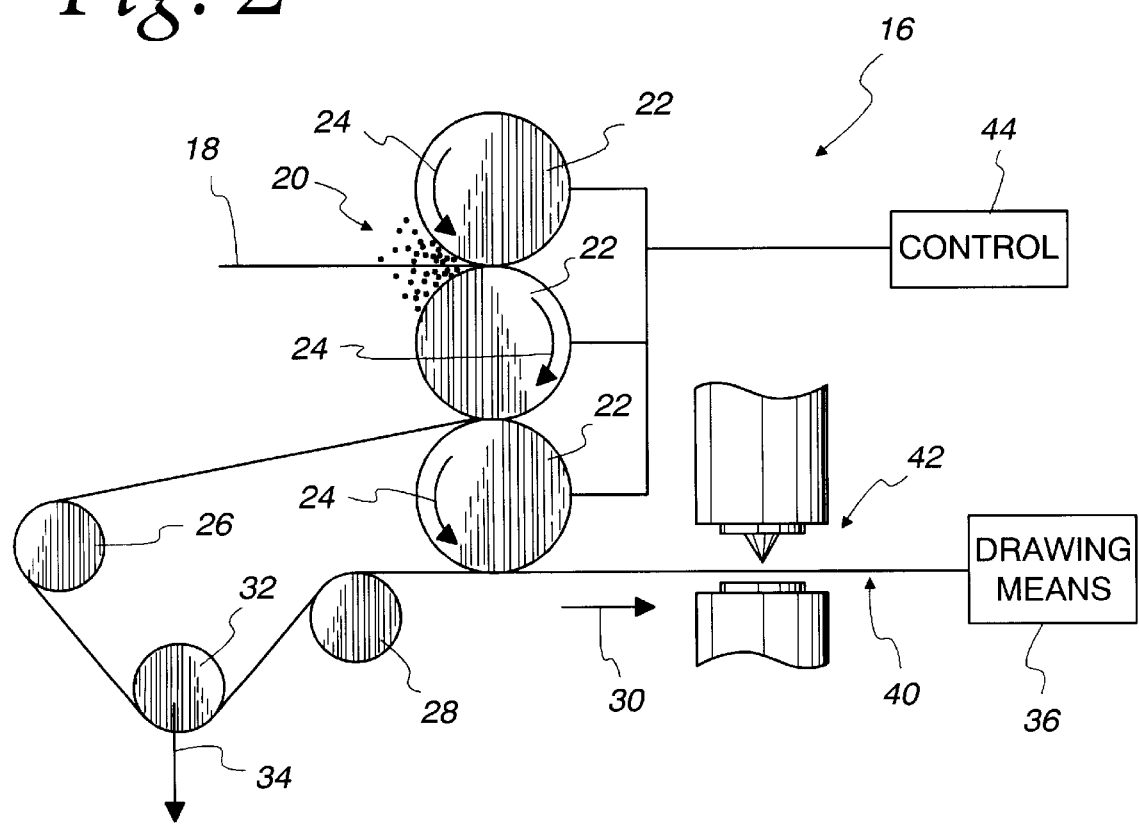
FIG. 2 is a side elevation view of a system for impregnating a cover fabric with rubber and bias cutting the cover fabric into bias sheets to produce a continuous roll of woven sheet for use with the present invention.

FIG. 2 shows a system at 16 for impregnating a sheet of woven material 18 with unvulcanized rubber 20 and then bias cutting the same. In the system 16, unvulcanized rubber 20 is continuously applied to the sheet of woven material 18 by means of cooperating calender rollers 22 rotating in the direction of the arrows 24 with respect to each other. This application method is commonly known as a friction method.

Figure 3A:
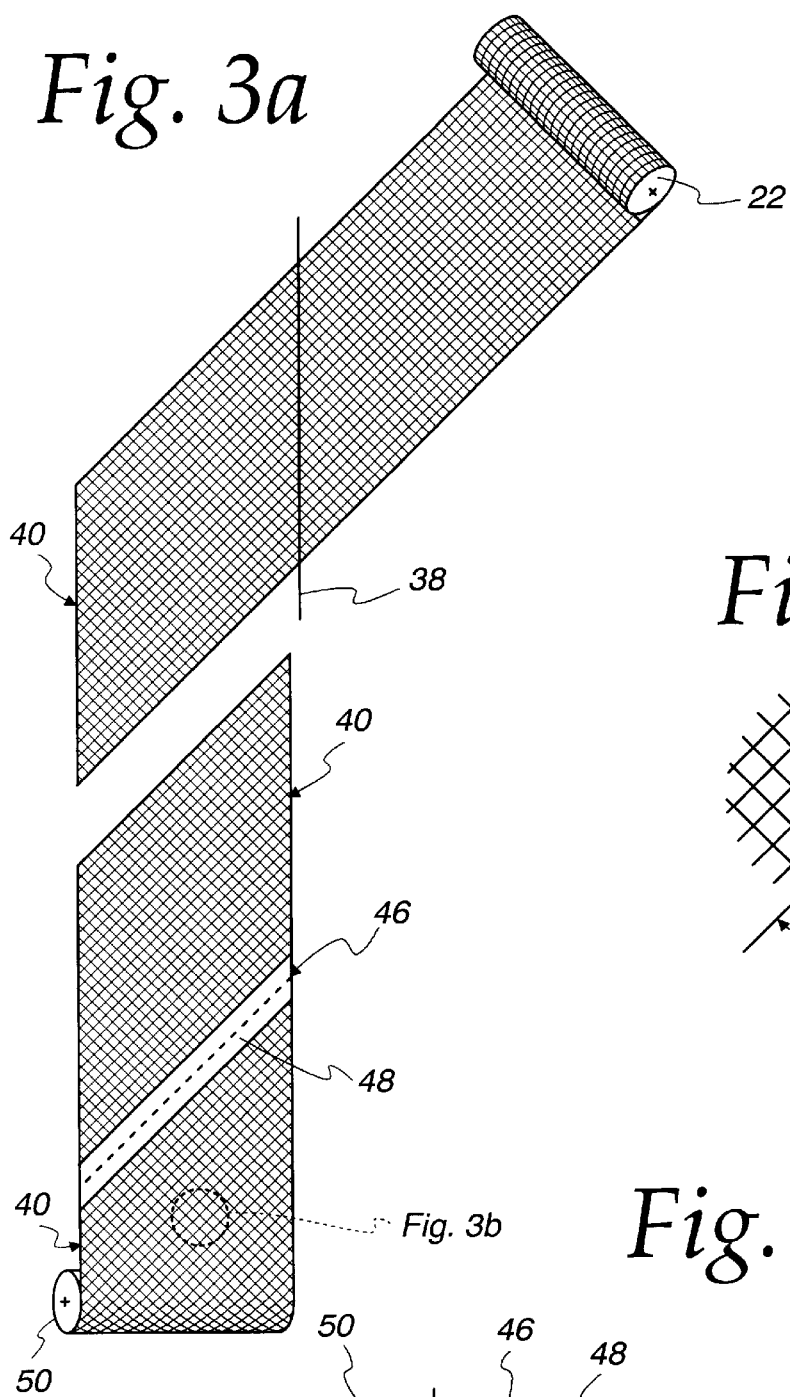
FIG. 3 is a perspective view illustrating an exemplary bias cut of the cover fabric in FIG. 2, and showing the joining of the bias sheets to produce the roll of woven sheet for use with the present invention.
Figure 3B:
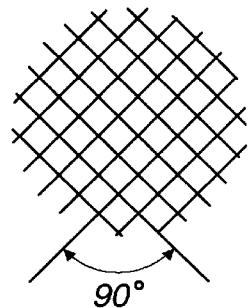

The sheet of woven material 18 exiting from between the bottom pair of rollers 22 is directed around guide rollers 26,28 into a horizontal path, moving in the direction of the arrow 30. A constant, predetermined tension is maintained on the sheet of woven material 18 by a tensioning roller 32 which is borne downwardly in the direction of the arrow 34 against the unsupported portion of the sheet of woven material 18 between the guide rollers 26,28. The sheet of woven material 18 is tensioned by a drawing means 36 and is bias cut at 38 (see FIG. 3) into bias sheets 40 by a conventional cutting apparatus generally depicted at 42. The calender rollers 22, drawing means 36 and cutting apparatus 42 are intermittently operated by a control 44.

In a preferred form, the woven material 18 comprises a canvas sheet defined by woven warp and weft fibers. Preferably, the bias cut is made such that the angle of the warp and weft fibers against the length of the canvas sheet is between 90° and 150°. The exemplary bias cut 38, shown in FIG. 3, results in an angle of the warp and weft fibers against the length of the canvas sheet of 90°, as is depicted in the enlarged portion of FIG. 3.

After bias cutting the woven material, an edge of one bias sheet 40 is placed in abutting relationship with an edge of another bias sheet 40 to define a butt joint shown generally at 46. An unwoven fabric tape 48 is placed over the butt joint 46 and is heat pressed to join the bias sheets 40 together. Preferably, the unwoven fabric tape 48 is made of unvulcanized rubber or plastic ink and is of the same color as the bias sheets 40. After heat pressing the unwoven fabric tape 48 onto the butt joint 46, the woven material 18 is rolled onto a roller 50.

Figure 4:
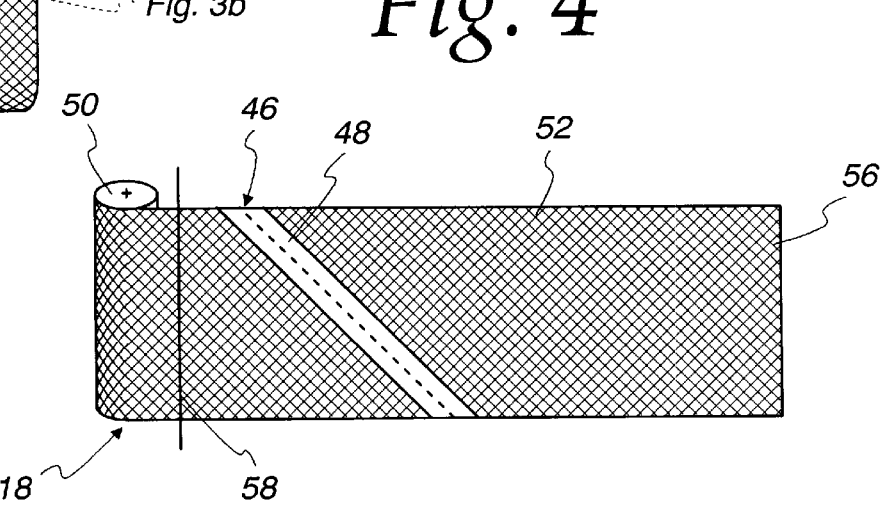
FIG. 4 is a perspective view illustrating an exemplary cut of the woven sheet into a specified length for use with the present invention.

The woven material 18 rolled on roller 50 is then unwound, as shown in FIG. 4, and cut into a woven sheet 52 of a specified length. While the woven sheet 52 shown in FIG. 4 includes the butt joint 46 where adjacent bias sheets 40 are joined together, depending upon the particular length of the woven sheet 52 required (i.e., the length of the belt 14), the butt joint 46 may or may not be included along the length of the woven sheet 52.

Figure 5:
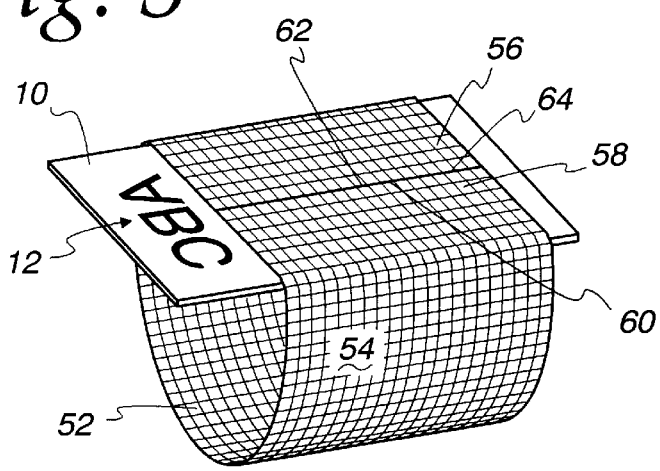
FIG. 5 is a perspective view of the woven sheet cut into a specified length and the discrete sheet element in operable form prior to adhering the discrete sheet element to the abutted ends of the woven sheet in accordance with the present invention.
Figure 6:
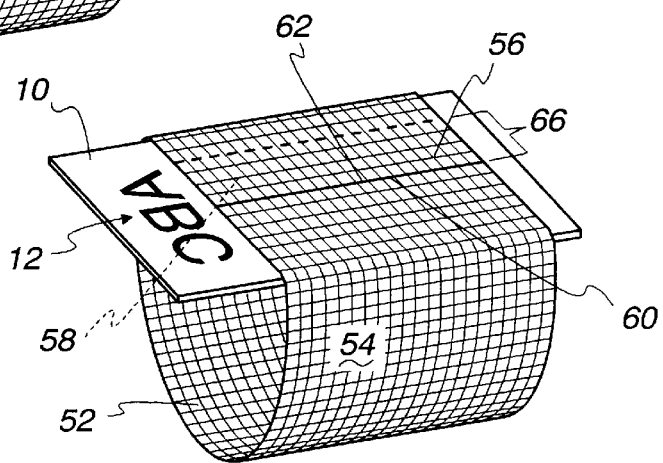
FIG. 6 is a perspective view of an alternative embodiment of the woven sheet and discrete sheet element in operable form prior to adhering the discrete sheet element to the abutted ends of the woven sheet in accordance with the present invention.

After cutting to a specified length, the woven sheet 52 is formed into an endless band 54 as shown in FIGS. 5–6. In a preferred form, the woven sheet 52 is formed into an endless band 54 by joining together the spaced ends 56,58 of the woven sheet 52 as seen in FIG. 5. More specifically, a butt edge 60 on the end 56 and a butt edge 62 on the end 58 are placed in abutting relationship, each to the other, and joined.

As shown in FIG. 5, the line of the seam 64 defining the butt joint between the butt edges 60,62 may be perpendicular to the line of the longitudinal extent of the woven sheet 52. However, it should be understood that the invention also contemplates cutting the woven sheet 52 at angles other than the perpendicular arrangement shown in FIG. 5.

Referring to FIG. 5, with the edges 60,62 abutted, the ends 56,58 of the woven sheet 52 are joined by the following technique. The discrete sheet element 10 with the identifying mark 12 thereon is placed over the ends 56,58 of the woven sheet 52. In this position, the discrete sheet element 10 covers the seam 64 (butt joint) between the butt edges 60,62.

In another form, the spaced ends 56,58 of the woven sheet 52 are overlapped to form the woven sheet 52 into an endless band 54, as shown in FIG. 6. The discrete sheet element 10 with the identifying mark 12 thereon is placed over the overlapped ends 56,58 of the woven sheet 52. In this position, the discrete sheet element 10 covers the overlap portion 66 defined by the overlapped ends 56,58 of the woven sheet 52.

Figure 7:
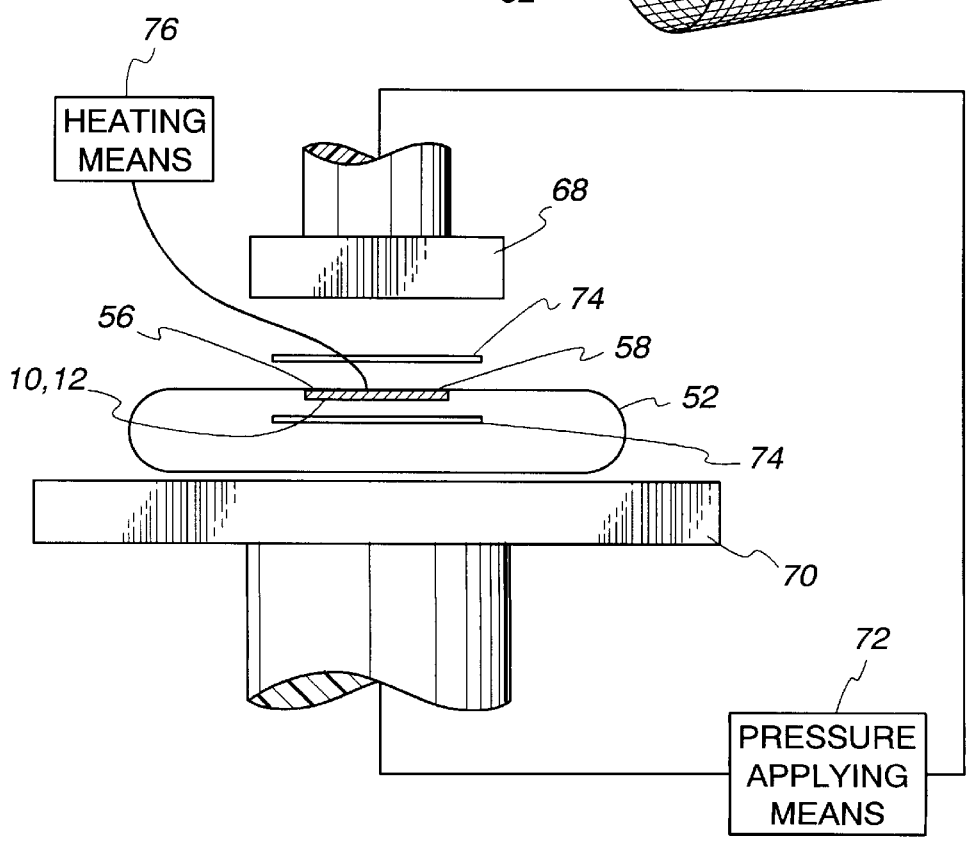
FIG. 7 is a side elevation view of a system for adhering the discrete sheet element against the abutted ends of the woven sheet according to the present invention.

The discrete sheet element 10 with the identifying mark 12 thereon and the ends 56,58 of the woven sheet 52 define a primary laminate. As shown in FIG. 7, the primary laminate is pressed between upper and lower press plates 68,70 by a conventional pressure applying means 72. Sheets of release paper 74 are provided to aid in the pressing process. The pressure applied to the primary laminate is preferably between 2.0 and 3.0 kg/cm².

While the pressing step is being carried out, the primary laminate is heated by a conventional heating means 76. Preferably, heat is applied at a temperature of 100° to 140° C.

As the above process is carried out, the discrete sheet element 10 with the identifying mark 12 thereon and the rubber 20 in the woven sheet 52 are both in an unvulcanized state. By applying pressure to the primary laminate, the discrete sheet element 10 with the identifying mark 12 thereon is forced into the fiber network of the woven sheet 52. Specifically, a multiplicity of recesses are formed through slight displacement of the warp and weft fibers of the woven sheet 52 to allow the discrete sheet element 10 with the identifying mark 12 thereon to migrate therebetween without significantly depressing the woven sheet 52 and without the discrete sheet element 10 projecting outwardly. If the discrete sheet element 10 is of the same color as the woven sheet 52, the discrete sheet element 10 should blend with the woven sheet 52, thus leaving only the identifying mark 12 visually apparent.

Forming the endless sleeve 54, with an identifying mark 12 impressed thereon, by the above method helps to reduce the noise generated by having a stepped portion formed on a back surface of the belt. Further, the above method helps minimize the generation of scrap caused by sewing, and when both the bias sheets 40 and the ends 56,58 of the woven sheet 52 are joined using a butt joint, the above method uses less material than if an overlap joint were implemented and is thus more effective from a cost standpoint.

Figure 8:
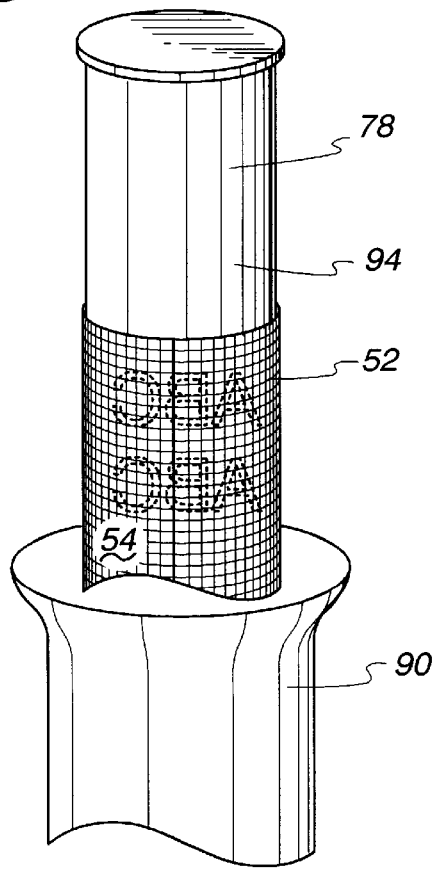
FIG. 8 is a perspective view demonstrating the step of placing the woven sheet with the discrete sheet element impressed thereon around a processing drum.

After the woven sheet 52 is formed into the endless sleeve 54 having an identifying mark 12 impressed thereon, the sleeve 54 is placed around a processing drum 78, as shown in FIG. 8. The individual belt components are then sequentially built up on the drum 78 over the endless sleeve 54.

Figure 9:
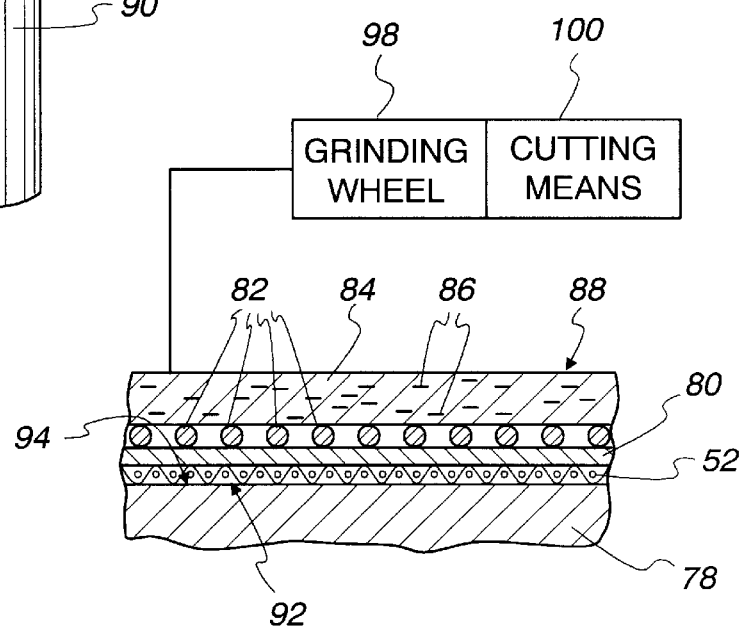
FIG. 9 is an enlarged, fragmentary, cross-sectional view of a belt sleeve defined on the processing drum of FIG. 5 in accordance with the present invention.

In an exemplary belt construction as shown in FIG. 9, a tension rubber layer 80 is placed about the endless sleeve 54/woven sheet 52. The tension rubber layer 80 is preferably made from a rubber consisting of at least one of natural rubber (NR), styrene-butadiene rubber (SBR), chloroprene rubber (CR), and nitrile rubber (NBR). However, other rubber composites having similar characteristics may be utilized. A load-carrying cord 82 is then spirally wrapped around the tension rubber layer 80 to define the load-carrying section of the belt. The cords 82 are preferably made from low elongation, high strength materials, such as nylon, polyester, aromatic polyamide, etc., which are spirally spun. A rubber layer 84 is then placed over the load carrying cord 82 to define the belt compression section. The compression rubber layer 84 is made preferably from the same types of rubber used to form the tension rubber layer 82. Short reinforcing fibers 86 are embedded in the compression rubber layer 84 and extend generally in a lateral direction. The fibers 86 may be made from synthetic material, such as nylon, vinylon, polyester, aromatic polyamide, etc. Alternatively, natural fiber, such as cotton, pulp, etc. can also be utilized.

Once all of the belt components are built up on the forming drum 78 into a belt sleeve 88, the drum 78 and components thereon (i.e., belt sleeve 88) are placed in a vulcanization jacket 90 (shown in FIG. 8). Vulcanization is carried out in a manner conventional to those skilled in the art. During vulcanization, the discrete sheet element 10 with the identifying mark 12 thereon cures into the woven sheet 52. The result is that the outside belt surface 92, which is the outer surface of the woven sheet 52, conforms to the forming drum surface 94 so that the entire surface is substantially uninterrupted and substantially flat. Accordingly, the discrete sheet element 10 and identifying mark 12 become an integral part of the woven sheet 52, and hence the power transmission belt 14.

The above-described method is a reverse processing method through which the components are sequentially built up in an inside out arrangement. The invention also contemplates a sequential building up of belt components in a normal configuration, that is, the layers could be built up by initially placing the compression rubber layer 84 directly against the forming drum 78, and thereafter sequentially wrapping the cord 82, applying the tension rubber layer 80 and then applying the woven sheet 52 with the discrete sheet element 10 having an identifying mark 12 thereon adhered thereto.

Once the belt sleeve 88 is vulcanized, individual ribs 96 (see FIG. 10) can be formed and/or individual belts 14 cut from the sleeve 88. With the belt components built up on the drum 78 in a normal processing method, the inside surface of the belt sleeve 88 is exposed for grinding/cutting. When the components are built up in the reverse processing method, the belt sleeve 88 must be turned inside out to enable the grinding/cutting of the inside belt surface. In either case, the compression rubber layer 84 of the belt sleeve 88 is ground/cut to form individual V-shaped grooves by means of a grinding wheel, or other similar apparatus, shown in schematic form at 98 in FIG. 9. The individual belts 14 are then cut from the sleeve 88 by a conventional cutting means, shown in schematic form at 100 in FIG. 9. The grinding wheel 98 and/or cutter 100 can be used to define ribs on a multi-ribbed belt, define the side surfaces of a raw edge belt and/or to cut individual belts 14 from the sleeve 88.

FIG. 10 shows a section of a completed multi-ribbed belt 14 made by joining the spaced ends 56,58 of the woven sheet 52 as shown in FIG. 5. The belt 14 has a tension rubber layer 80, load-carrying cords 82, and a compression rubber layer 84 having grooves 102 formed lengthwise therein to define a plurality of laterally spaced, longitudinally extending ribs 96. The outside belt surface 92 includes the identifying mark 12 embedded therein and is defined primarily by the absence of any stepped portions or recesses along the length thereof.

It is to be understood that the foregoing description was made for the purposes of demonstrating the basic operation of the present invention, and no unnecessary limitations are to be understood therefrom.

I claim:

1. A method of applying an identifying mark onto a power transmission belt/belt sleeve, said method comprising the steps of:

providing a discrete sheet element with an identifying mark thereon;

providing a woven sheet having spaced ends;

abutting the spaced ends of the woven sheet to each other;

placing the discrete sheet element over the abutted ends of the woven sheet;

adhering the discrete sheet element to the abutted ends of the woven sheet; and combining the woven sheet with the discrete sheet element adhered thereto with at least one other component to produce an unvulcanized power transmission belt/belt sleeve, with the identifying mark displayed on an exposed surface of the power transmission belt/belt sleeve.

2. The method of claim 1, including the step of vulcanizing the unvulcanized power transmission belt/belt sleeve.

3. The method of claim 1, wherein the discrete sheet element and the abutted ends of the woven sheet define a primary laminate, and wherein the step of adhering the discrete sheet element to the abutted ends of the woven sheet comprises the step of applying heat to the primary laminate.

4. The method of claim 3, wherein the step of applying heat to the primary laminate comprises the step of heating the primary laminate at a temperature of 100° to 140° C. while pressing the discrete sheet element and woven sheet, one against the other.

5. The method of claim 4, wherein the step of pressing the discrete sheet element and woven sheet, one against the other, comprises the step of applying a pressure of 2.0 to 3.0 kg/cm$^2$ between the discrete sheet element and woven sheet.

6. The method of claim 1, wherein the step of adhering the discrete sheet element to the abutted ends of the woven sheet comprises the step of pressing the discrete sheet element and woven sheet, one against the other.

7. The method of claim 6, wherein the discrete sheet element and the abutted ends of the woven sheet define a primary laminate, and including the step of applying heat to the primary laminate during the step of pressing the discrete sheet element and woven sheet, one against the other.

8. The method of claim 7, wherein the steps of applying heat to the primary laminate and pressing the discrete sheet element and woven sheet, one against the other, comprise the steps of applying heat at a temperature of 100° to 140° C. and a pressure of 2.0 to 3.0 kg/cm$^2$.

9. The method of claim 1, including the step of impregnating the woven sheet with an unvulcanized rubber before the step of adhering the discrete sheet element to the abutted ends of the woven sheet.

10. The method of claim 1, wherein the discrete sheet element comprises an unwoven fabric having at least one of (a) a resinbonded and (b) a spunbonded composition.

11. The method of claim 1, wherein the discrete sheet element has a thickness of 0.10 to 0.40 mm and consists of at least one of nylon, polypropylene, polyester and rayon.

12. The method of claim 1, wherein the identifying mark is applied to the discrete sheet element by a silk screen method comprising at least one of (a) soaking the discrete sheet element in a plastic ink and (b) impregnating the discrete sheet element with an unvulcanized rubber.

13. The method of claim 1, wherein the woven sheet comprises a canvas sheet defined by woven warp and weft fibers.

14. The method of claim 1, wherein the step of combining the woven sheet with at least one other component comprises the steps of placing the woven sheet with the discrete sheet element adhered thereto on a forming drum and sequentially building up components on the woven sheet making up a tension section, a load-carrying section and a compression section.

15. The method of claim 14, including the step of vulcanizing the unvulcanized power transmission belt/belt sleeve.

16. A method of manufacturing a power transmission belt and placing an identifying mark onto the power transmission belt, said method comprising the steps of:

providing a discrete sheet element with an identifying mark thereon;

abutting spaced ends of a woven sheet to define a butt joint;

placing the discrete sheet element over the abutted ends of the woven sheet and butt joint to define a primary laminate;

heating the primary laminate while pressing the abutted ends of the woven sheet and discrete sheet element, one against the other;

combining the woven sheet with the discrete sheet element thereon with a plurality of belt layers, wherein the plurality of belt layers defines a secondary laminate on a forming drum so that the woven sheet with the discrete sheet element defines one of the innermost and outermost layers on the secondary laminate, and wherein the secondary laminate with the woven sheet having the discrete sheet element thereon defines an unvulcanized belt sleeve with the identifying mark displayed on an exposed surface of the unvulcanized belt sleeve; and vulcanizing the unvulcanized belt sleeve.

17. The method of claim 16, wherein the step of heating the primary laminate while pressing the abutted ends of the woven sheet and discrete sheet element, one against the other, comprises the step of applying heat at a temperature of 100° to 140° C. while applying a pressure of 2.0 to 3.0 $kg/cm^2$.

18. The method of claim 16, including the step of impregnating the woven sheet with an unvulcanized rubber before the step of heating the primary laminate while pressing the abutted ends of the woven sheet and discrete sheet element, one against the other.

19. The method of claim 16, wherein the step of providing a discrete sheet element comprises the step of providing an unwoven fabric consisting of at least of nylon, polypropylene, polyester and rayon that is at least one of (a) a resinbonded and (b) a spunbonded composition, and has a thickness of 0.10 to 0.40 mm, and wherein the woven sheet comprises a canvas sheet defined by woven warp and weft fibers.

20. The method of claim 19, wherein the identifying mark is applied to the unwoven fabric by a silk screen method consisting of at least one of (a) soaking the unwoven fabric in a plastic ink and (b) impregnating the unwoven fabric with an unvulcanized rubber.

* * * * *